(12) United States Patent
Hughes et al.

(10) Patent No.: US 7,043,447 B2
(45) Date of Patent: May 9, 2006

(54) METHOD FOR FACILITATING A TRANSACTION FOR PURCHASABLE CONTENT OVER AN ELECTRONIC NETWORK

(75) Inventors: David A. Hughes, New York, NY (US); Allen J. Smith, Garrison, NY (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 895 days.

(21) Appl. No.: 09/836,094

(22) Filed: Apr. 17, 2001

(65) Prior Publication Data

US 2002/0023013 A1    Feb. 21, 2002

Related U.S. Application Data

(60) Provisional application No. 60/198,202, filed on Apr. 19, 2000.

(51) Int. Cl.
G06Q 30/00 (2006.01)

(52) U.S. Cl. .......................... 705/26; 705/27
(58) Field of Classification Search .................. 705/26, 705/59, 27
See application file for complete search history.

(56) References Cited

U.S. PATENT DOCUMENTS

| | | | |
|---|---|---|---|
| 5,220,625 A | 6/1993 | Hatakeyama et al. | |
| 5,457,746 A | 10/1995 | Dolphin | |
| 5,918,213 A | 6/1999 | Bernard et al. | |
| 6,049,785 A | 4/2000 | Gifford | |
| 6,141,006 A | 10/2000 | Knowlton et al. | |
| 6,154,773 A | 11/2000 | Roberts et al. | |
| 6,226,618 B1 | 5/2001 | Downs et al. | |
| 6,233,682 B1 * | 5/2001 | Fritsch ....................... | 713/168 |
| 6,314,409 B1 | 11/2001 | Schnect et al. | |
| 6,345,256 B1 | 2/2002 | Milsted et al. | |
| 6,385,596 B1 * | 5/2002 | Wiser et al. ................... | 705/51 |
| 6,421,726 B1 * | 7/2002 | Kenner et al. .............. | 709/225 |

(Continued)

FOREIGN PATENT DOCUMENTS

EP    1187078 A2    3/2002

(Continued)

OTHER PUBLICATIONS http://www.digitalriver.com, retrived via <http://web.archive.org/web/19990202101534/www.digitalriver.com, Apr. 24, 1999.*

(Continued)

Primary Examiner—Jeffrey A. Smith
Assistant Examiner—Matthew S Gart
(74) Attorney, Agent, or Firm—Miller Patent Services; Jerry A. Miller

(57) ABSTRACT

A transaction for purchasable content is facilitated over an electronic network, wherein the purchasable content includes downloadable digital data. A first presence is maintained on the electronic network to which a consumer may connect. A first page is transmitted from the first presence to the consumer over the electronic network, such that the first page includes information concerning the purchasable content. A command is received from the consumer over the electronic network indicating that the consumer wishes the transaction for the purchasable content. The consumer is automatically linked to a second presence on the electronic network in response to the command such that the consumer may interact with the second presence over the electronic network to complete the transaction for the purchasable content.

8 Claims, 18 Drawing Sheets

U.S. PATENT DOCUMENTS

| | | |
|---|---|---|
| 6,460,076 B1 | 10/2002 | Srinivasan |
| 6,574,606 B1 | 6/2003 | Bell et al. |
| 6,611,812 B1 * | 8/2003 | Hurtado et al. ............... 705/26 |
| 6,697,944 B1 | 2/2004 | Jones et al. |
| 6,799,165 B1 * | 9/2004 | Boesjes ....................... 705/28 |
| 2002/0002496 A1 * | 1/2002 | Miller et al. .................. 705/26 |
| 2002/0035538 A1 | 3/2002 | Moreau |
| 2002/0087467 A1 | 7/2002 | Mascavage, III et al. |
| 2002/0120568 A1 | 8/2002 | Leblang et al. |

FOREIGN PATENT DOCUMENTS

JP  2001312283 A  * 11/2001

OTHER PUBLICATIONS

PR Newswire, Universal Music Group To Use NatWest's Magex for Digital Music Payments, New York, Nov. 15, 1999. Proquest [online] [Retrieved on Sep. 16, 2002].

* cited by examiner

FIG. 6D

```
MusicRetailer.com
view by                      [search] [new releases] [customer service] [shopping cart]
artist|genre|format|merchandise
# A B C D E F G H I J K L M
  N O P Q R S T U V W X Y Z    your current order for physical goods is as follows:
by artist                       product ID      Item              price  quantity subtotal  }130
p
• P.Y.T.                        68164EK         Yield             $14.98   [1]    $14.98
• Michael Pabst                 your current order for downloads is as follows:
• Patti Page                                                      price  quantity subtotal
• Eduardo Paniagua              product ID      Item                                        }132
• Leon Parker                   06639USSM19     Everything Is     $2.49     1     $2.49
• Andrew Parker                                 Everything
• Dolly Parton                  To change an item's quantity, edit the number and press "Updat
• Jaco Pastorius                Order". [      ]
• Mandy Pantinkin               update order  clear all  [ submit order ]
• Patra
• Sandi Patty
• Billy Paul                    The total charges for your downloads are $2.49.  After
• Les Paul                      confirming your physical goods purchase, you will be
• Luciano Pavarotti             instructed to complete your download transaction.
• Johnny Paycheck
• Peach Union                           Shipments made within the U.S. only
• Peaches & Herb
• Pearl Jam
• Paco Pena
• Michael Penn
• M People
• Murray Perahia
• Itzhak Perlman
• Joe Perry
• Steve Perry
• Joe Pesci
• Petra
• The Philadelphia Brass
Ensemble
• Jill Phillips
• The Philosopher Kings
• Chonda Pierce
• Pink Floyd
```

*MusicRetailer.com* [customer service] [shopping cart] [continue shopping]

100E

The total charges for your physical goods are $18.87. Please fill in the credit card information and billing address. When you are ready, press the "Submit Order" button to confirm this order and make your purchase.

A special digital download window will appear to guide you through getting your digital downloads once you have completed the information on this page and submit your order. YOU WILL BE BILLED SEPARATELY FOR DOWNLOADS Order Summary

| charges | total |
|---|---|
| Physical goods Total: | $14.98 |
| Tax: | $0.90 |
| Shipping: | $2.99 |
| Physical goods sub Total: | $18.87 |
| Download sub Total: | $2.49 |
| Plus Applicable Sales Tax: | |
| Download Total: | $2.49 |
| Sub Total: | $21.51 |

140 { Physical goods rows }
142 { Download rows }

Credit Card Information — 144

- Name: John Q. Public
- Number: **************
- Type: Master Card
- Exp: Nov 2001

Billing Address — 146

- First Name: John
- Last Name: Public
- Phone: 201-555-1234
- Street: 1 Anywhere Drive
- Apt:
- City: Yourtown
- State: NEW JERSEY  Zip: *****

[ submit order ]

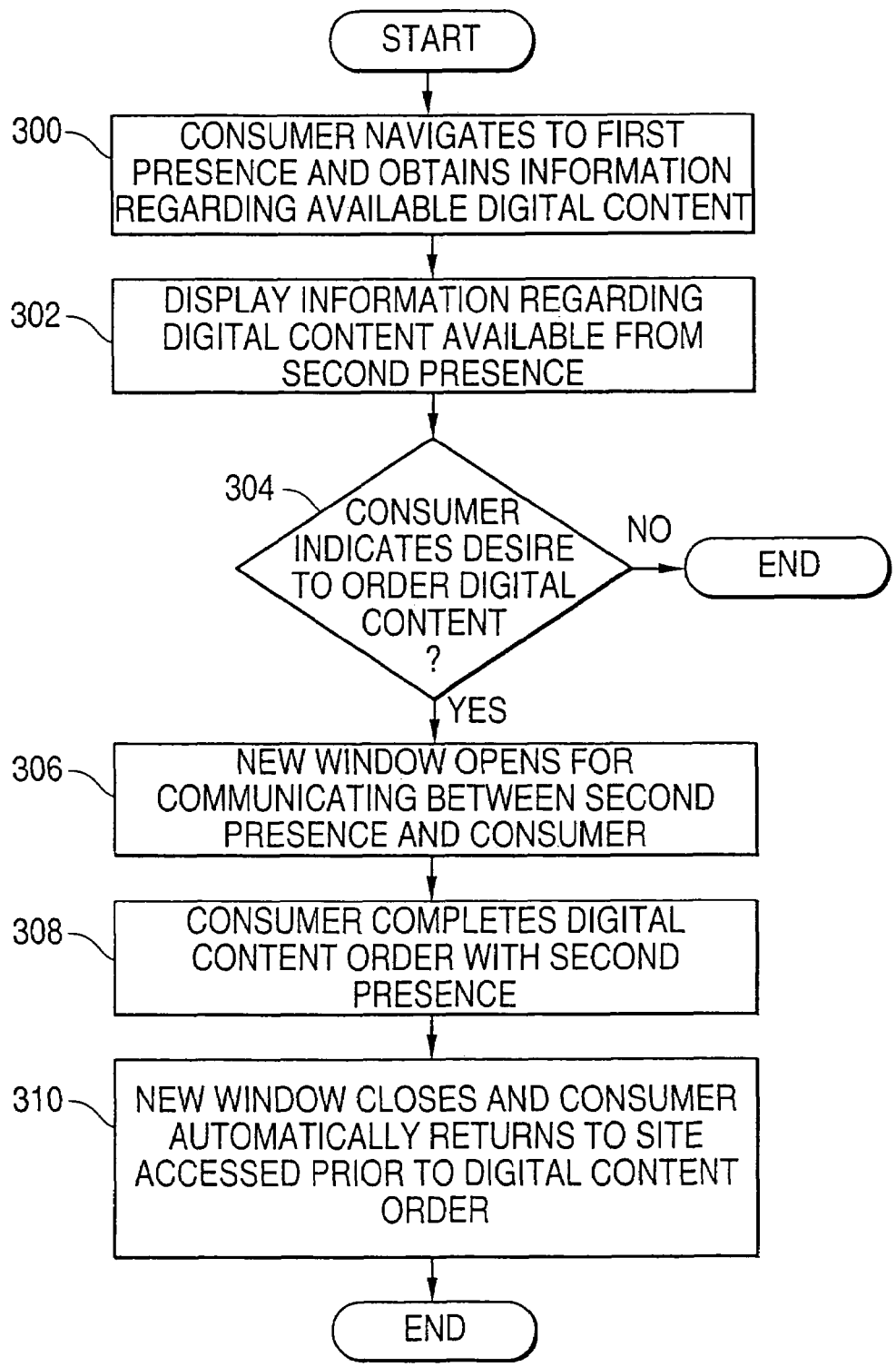

FIG. 8A

SONY MUSIC™        downloads 1 registration      ①2 3 4 HELP

*Welcome Sony Music customer*

You will need to follow an easy 4-step process to complete the purchase of your Sony Music digital downloads. The first necessary step is to register, or log on to, your Download Services Account. The account will enable our customer service staff to help you with any questions you may have about your purchase.

Please Note:

Your credit card has not yet been charged for your music downloads. If you have any questions about downloading music, click here for FAQ's.

*DOWNLOAD SERVICES ACCOUNT*

Information regarding your music downloads will be e-mailed to you.

*NEW SONY MUSIC DOWNLOAD CUSTOMER*

To receive your music downloads all fields must be complete.

Your Name: [ ]
Email: [ ]
US Zip Code: [ ]
Password: [ ]

Passwords must be at least 6 characters.

Re-enter password: [ ]

[ Next ]

*RETURNING SONY MUSIC DOWNLOAD CUSTOMER*

To receive your music downloads all fields must be complete.

E-mail/User ID: [ ]
Password: [ ]

[ Login ]

FIG. 8B

SONY MUSIC™ — 202 downloads

2 billing information

1 (2) 3 4 HELP

Your order reference number is 7223750.
You have selected the following music downloads:

Please print this page by clicking the printer icons, or write down your order reference number so that we may serve you better.

208 {
| artist | title | cost |
|---|---|---|
| Lauryn Hill | Everything Is Everything | $2.49 |

I would like to receive more information on this artist ☐ —210

Sub-Total $2.49
Sales Tax $0.00
Grand Total $2.49

BILLING INFORMATION

To receive your music downloads all required (*) fields must be complete.

212 {
- Credit Card: ⊙ VISA ○ MasterCard ○ American Express
- Name on Card: [        ] *
- Card Number: [        ] *
- Expiration: [01 ▼] [2000 ▼] *
- Address: [        ] *
  [        ]
- City: [        ] *
- State: [Alabama ▼] *
- U.S. Zip Code: [*****] *

[ Next ] —214

Please Note

Your credit card has not yet been charged for your music downloads

This site uses the industry wide security feature called Secure Sockets Layer protocol ("SSL") in order to further protect your credit card and personal information between your browser and our server.

You will be able to return to this session for the next 48 hours. If necessary by using the link in the e-mail we have sent you with your account information.

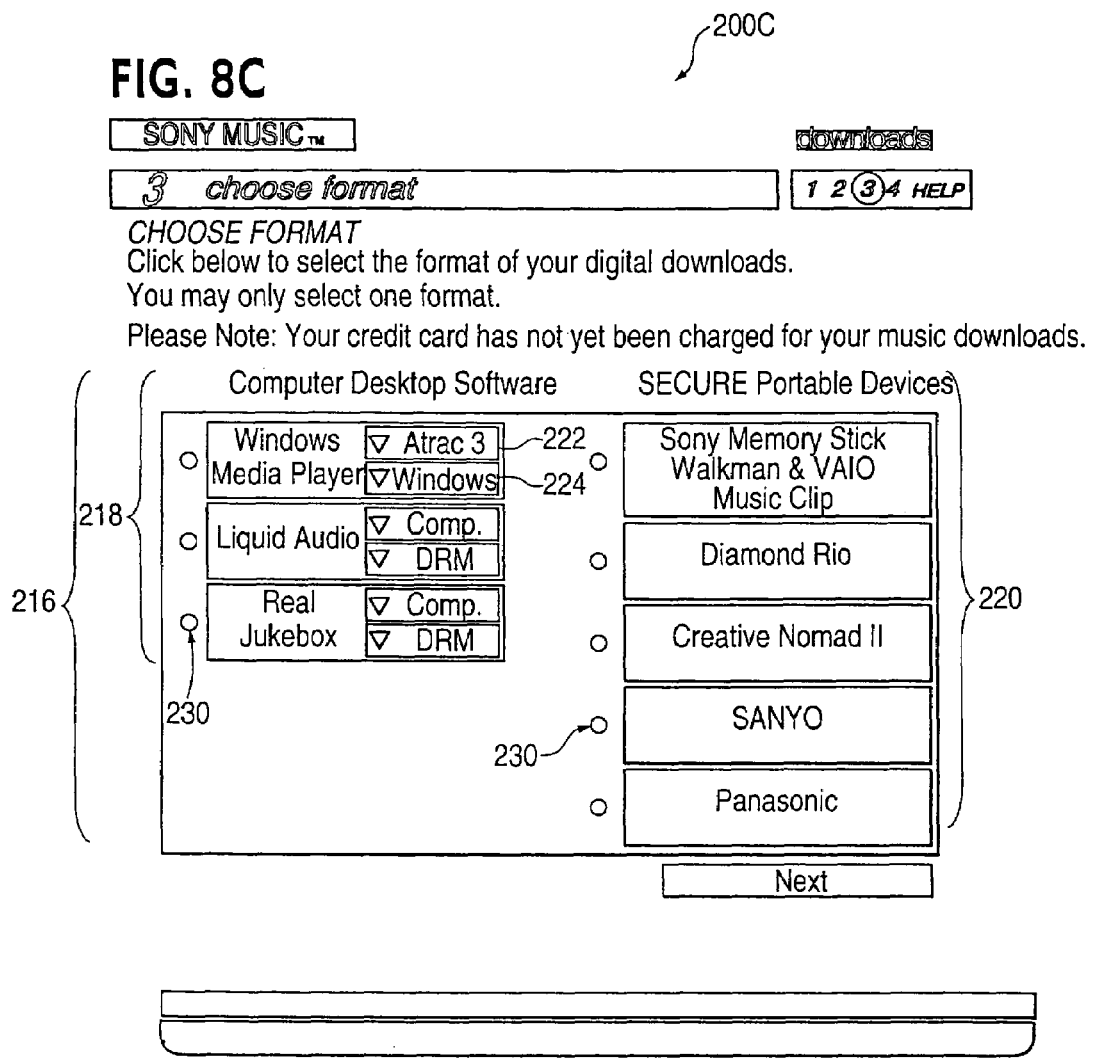

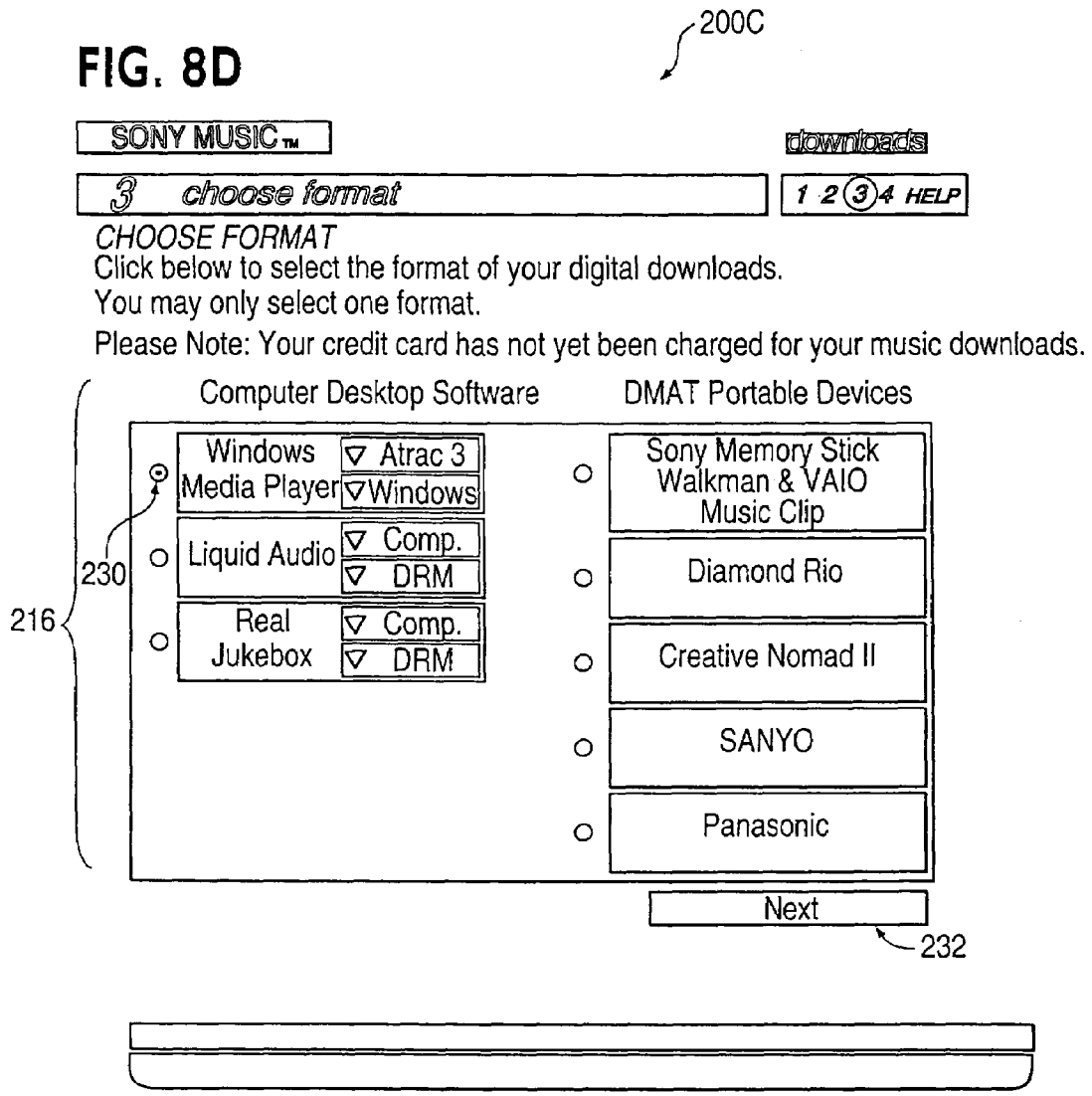

FIG. 8E
You do not have the proper versions of Window Media Player and ATRAC3 Plug-In installed. You can download the latest versions of each by clicking the link below.
Windows Media Player and ATRAC3 for Internet Explorer
Once you finish with the installation, click the continue button.
Continue ←—234
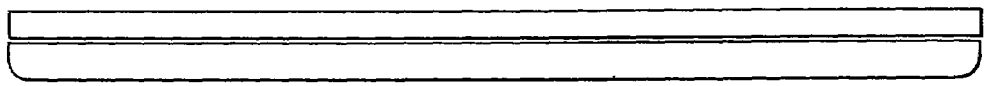

⌐200E

| SONY MUSIC™ | | downloads |
|---|---|---|
| 3 choose format | | 1 2 ③ 4 HELP |

*SOFTWARE VERIFICATION*

We have verified that you have the proper software necessary to enjoy the downloads you have chosen.

Please Note: Your credit card has not yet been charged for your music downloads.

You may now click the 'Complete Purchase' button to be able to download your songs.

Complete Purchase

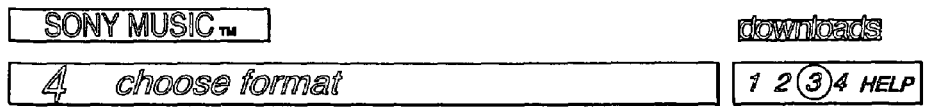

*4  choose format*    *1 2 ③ 4 HELP*

*DOWNLOAD YOUR SONGS*

We have charged your credit card.

For each download you should click your mouse on the 'Download Song' link, and then select a location for the song file. After the downloading is complete, go to the location to where you have saved the song, and doubleclick on the file to play the music. It is necessary to do this separately for each download.

| artist | title | time | file size | |
|---|---|---|---|---|
| Lauryn Hill | Everything Is Everything | 3:56 | 3.88 MB | Download Song |

～238

Estimated time to complete digital download (file size 4 Mb)

| Modem Speed | Estimated time |
|---|---|
| 28.8 Kbps | 21 mins 20 secs |
| 56.0 Kbps | 9 mins 20 secs |

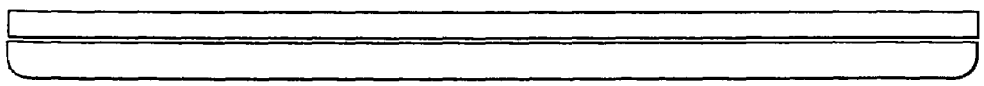

METHOD FOR FACILITATING A TRANSACTION FOR PURCHASABLE CONTENT OVER AN ELECTRONIC NETWORK

CROSS REFERENCE TO RELATED APPLICATIONS

This application is based on and claims the benefit of U.S. Provisional Patent Application No. 60/198,202, entitled METHODS AND APPARATUSES FOR PRESENTING CONTENT AVAILABLE BY DIGITAL DOWNLOAD, AND FULFILLING DIGITAL DOWNLOAD PURCHASES, filed Apr. 19, 2000, the entire disclosure of which is hereby incorporated by reference.

BACKGROUND OF THE INVENTION

The present invention relates generally to facilitating transactions between a consumer and one or more entities over an electronic network. More particularly, the present invention relates to a method and apparatus for presenting and obtaining purchasable content, such as downloadable digital data and physical storage media at least party by way of the electronic network.

It is known to browse for, and purchase, goods over the Internet. For example, SamGoody.com offers the purchase of CDs, tapes, DVDs, etc. containing music and/or video via the Internet. It is also known to download digital data over the Internet. For example, MP3.com offers various music titles for free downloading in the MP3 format. While free downloading of digital data has proliferated, there remains a need for effective mechanisms and techniques for permitting consumers to access, purchase, and download digital data, such as music, legitimately. Secure, user-friendly arrangements for allowing legitimate purchase of downloadable digital data would attract an untapped audience of purchasers, and would thus expand the market for digital data downloads. In turn, digital data providers would be encouraged to make more digital data available to consumers.

While physical goods, such as CDs, tapes, DVDs, may be purchased over the Internet, a user-friendly arrangement for permitting the purchase of such physical goods and/or the downloading of digital data has heretofore not been adequately developed. A secure, user-friendly arrangement for permitting purchase of physical goods and/or legitimate downloading of digital data would address many issues currently faced by consumers and providers. In particular, in many instances a provider of physical goods does not have custody of downloadable digital data, but would welcome the opportunity to market such digital data (particularly for a fee). Likewise, providers of downloadable digital data may not have the market penetration enjoyed by a provider of physical goods and would welcome the opportunity to market its downloadable digital data to consumers through the provider of physical goods.

SUMMARY OF THE INVENTION

A transaction for purchasable content is facilitated over an electronic network, the purchasable content including downloadable digital data. According to the present invention, a first presence is maintained on the electronic network to which a consumer may connect. A page is transmitted from the first presence to the consumer over the electronic network, the page including information concerning the purchasable content. A command is received from the consumer over the electronic network indicating that the consumer wishes the transaction for the purchasable content. The consumer is then automatically linked to a second presence on the electronic network in response to the command such that the consumer may interact with the second presence over the electronic network to complete the transaction for the purchasable content.

In accordance with one aspect of the present invention, a commission is received from an entity associated with the second presence based on the transaction for the purchasable content.

Other features and advantages of the present inventions will become apparent to one skilled in the art in view of the disclosure herein taken in combination with the accompanying drawings.

BRIEF DESCRIPTION OF THE DRAWINGS

The present invention is illustrated in the figures of the accompanying drawings which are meant to be exemplary and not limiting, and in which like reference characters are intended to refer to like or corresponding parts:

FIGS. 6A–6E are graphical representations of screen displays illustrating one or more pages that may be transmitted from a first presence to a consumer over an electronic network in accordance with the present invention;

FIG. 7 is a flow diagram illustrating operations carried out by one or more of the entities of FIG. 1 in accordance with the present invention; and FIGS. 8A–8G are graphical representations of screen displays illustrating one or more pages that may be transmitted from a second presence to a consumer over an electronic network in accordance with the present invention.

DETAILED DESCRIPTION OF THE PREFERRED EMBODIMENTS

Figure 1:
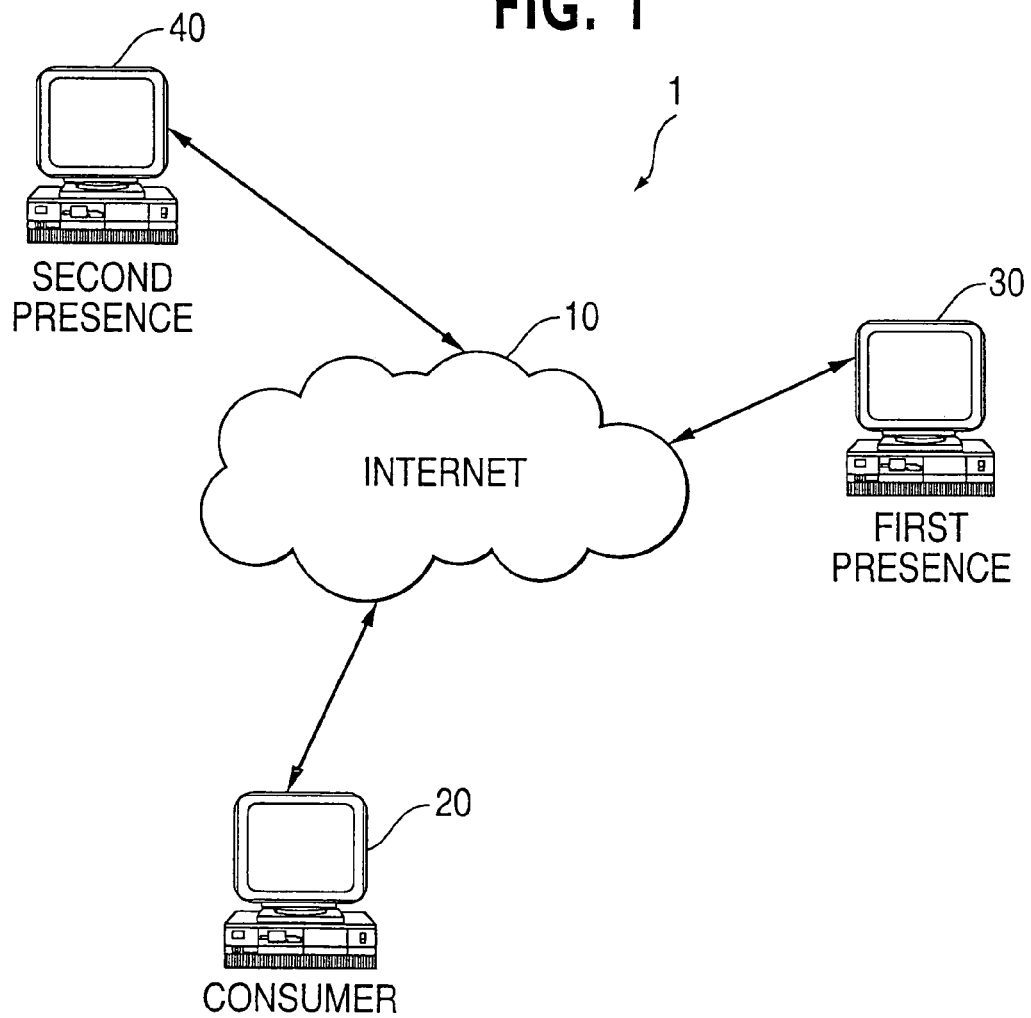
FIG. 1 is a block diagram illustrating a system in accordance with the present invention.

Referring now to the drawings, there is shown in FIG. 1 a block diagram illustrating a system 1 suitable for implementing one or more aspects of the present invention. The system 1 includes an electronic network 10, such as a wireless network, a hard-wired network, an analog network, a digital network, etc. It is preferred that the electronic network 10 is the Internet. The system 1 also includes one or more consumers 20 coupled to the electronic network 10 using any of the known techniques. It is understood that the consumer 20 is illustrated by a computing device coupled to the electronic network 10, but that the computing device may be manipulated by a human being (i.e., a consumer of goods, services, data, etc.). Thus, the consumer 20 will refer herein to the human and/or the computing device as is appropriate. It is noted that the consumer's computing device 20 may take on many different forms, such as traditional non-mobile computing devices, including personal computers, set-top boxes, telephones, etc. Mobile computing devices are also contemplated, such as personal digital assistant (PDA) units (e.g., devices/computers such as the Palm Pilot™, etc.); cell phones (including Internet enabled cell phones); hand held computers (e.g., those including wireless modems); laptop computers; etc.

The system 1 also includes at least one of a first presence 30 and a second presence 40, coupled to the electronic network 10 using any of the known techniques. For the purposes of the invention disclosed herein, a "presence" on the electronic network 10 may represent a collection of files (e.g., web site files, pages, etc.) that may be transmitted to entities coupled to the electronic network 10, such as the consumers 20. The pages may be in any appropriate format, such as the Hypertext Markup Language (HTML) and/or the Extensible Markup Language (XML), it being understood that the artisan skilled in the art will recognize alternative programming languages and techniques that are, or may become, available. The term "presence" as used herein may also encompass an apparatus or apparatuses employed to transmit or otherwise make the pages available to the entities over the electronic network 10. For example, network servers are often employed for this purpose. Such servers include one or more processors capable of executing one or more software programs, where the processor(s) are coupled to the electronic network 10 such that the one or more software programs control the creation, manipulation, transmission, etc. of the pages. The server(s) may be implemented using one or more computing devices disposed at one more geographic locations. The term "presence" as used herein may also refer to one or more entities that maintain, create, control, or are otherwise associated with the server(s) and/or the pages that are to be transmitted over the electronic network 10.

In accordance with one or more aspects of the present inventions, the first presence 30 is preferably a purchasable content marketer, i.e., a presence on the electronic network 10 concerned with marketing and/or retailing purchasable content to the one or more consumers 20. It will be appreciated that the first presence 30 may be an entertainment retailer or marketer, such as TowerRecords.com, CDNow.com, etc.

The purchasable content preferably includes at least one of downloadable digital data (i.e., digital data capable of being transmitted over the electronic network 10 to the one or more consumers 20) and physical storage media (i.e., a product capable of storing digital data or analog data). It will be appreciated that the downloadable digital data and/or the digital/analog data of the physical storage media may include one or more of audio, video, and. It is preferred that the audio data is music. Those skilled in the art will appreciate from the disclosure herein that the physical storage media may be optically readable media (e.g., audio discs, video discs, mini-discs, etc.), electrically readable media (e.g., micro-processor readable memories, memory sticks, etc.), magnetically readable media (e.g., cassette tapes, video tapes, etc.), and mechanically readable media (e.g., vinyl discs, etc.). When the purchasable content relates to music, the phrase "music title" (or single) and the term "album" are often used. It is understood that the phrase "music title" as used herein encompasses respective songs recorded by one or more artists. It is understood that the term "album" as used herein broadly relates to one or more recordings produced as a single unit (e.g., a number of music titles recorded on a single physical storage medium).

Figure 2:
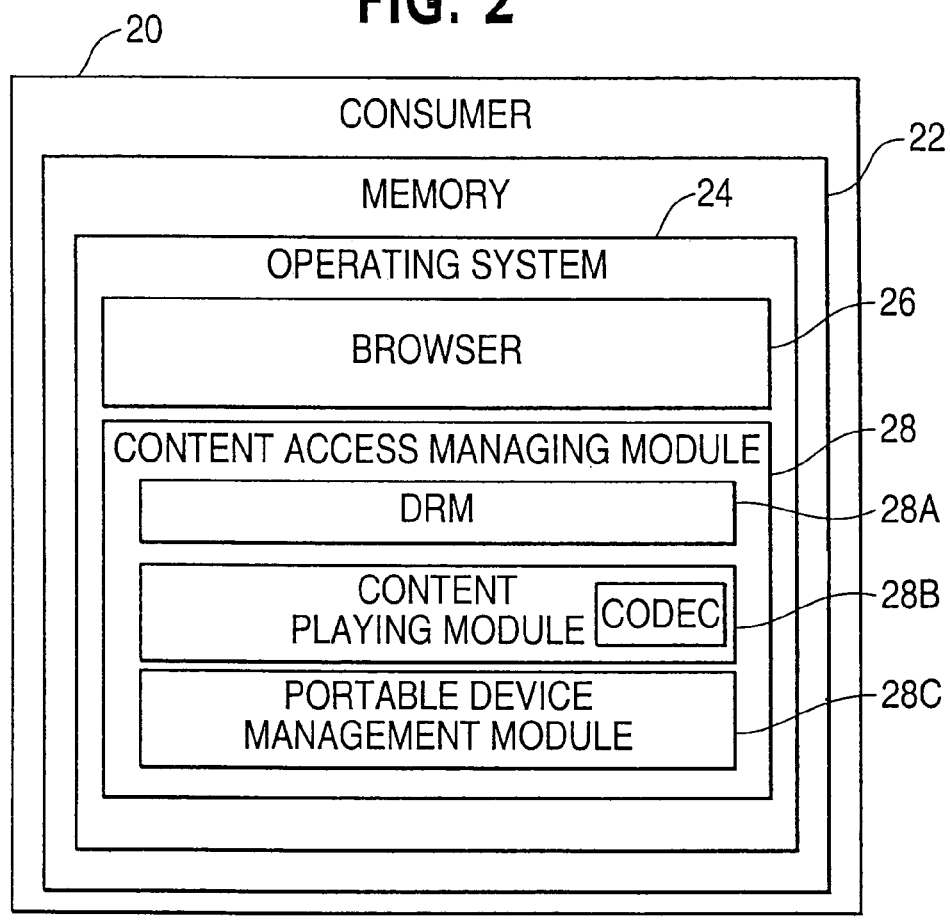
FIG. 2 is a block diagram illustrating the structure of an apparatus utilized by a consumer in accordance with the present invention.

Referring now to FIG. 2, the consumer's computing device 20, a desktop personal computer for example, is illustrated in terms of some of its features and/or functions. In addition to a processing unit (e.g., a CPU, I/O devices, peripherals, etc., not shown), the consumer's computing device 20 preferably includes a memory 22 for storing software resources (or programs), which may be executed by the processing unit to achieve various functions. The memory 22 may store, among other things, an operating system 24, such as any of the known operating systems, Windows 95/98/NT operating systems provided by Microsoft Inc. of Redmond, Wash., Mac-OS, and LINUX being examples.

A browser program 26 may operate on, or be integrated into, the operating system 24, it being understood that the browser program 26 provides the consumer's computing device 20 with the functionality required to obtain pages from the electronic network 10 and manipulate one or more of those pages (for example, by activating one or more icons thereon, inputting text information, or otherwise interacting with one or more of the pages to obtain useful results). Netscape Navigator and Internet Explorer are examples of suitable browser programs 26 for use with the present inventions.

The consumer's computing device 20 also preferably includes a content access managing module 28 having digital rights management (DRM) software 28A, a content playing module (preferably including a CODEC) 28B, and a portable device management module 28C. It is understood that these modules may take the form of software only, hardware only, or a combination of software and hardware as needed. As will be discussed in more detail below, the browser program 26 and the content access managing module 28 are utilized to facilitate a transaction for purchasable content between the consumer 20 and one or both of the first and second presence 30, 40.

Figure 3:
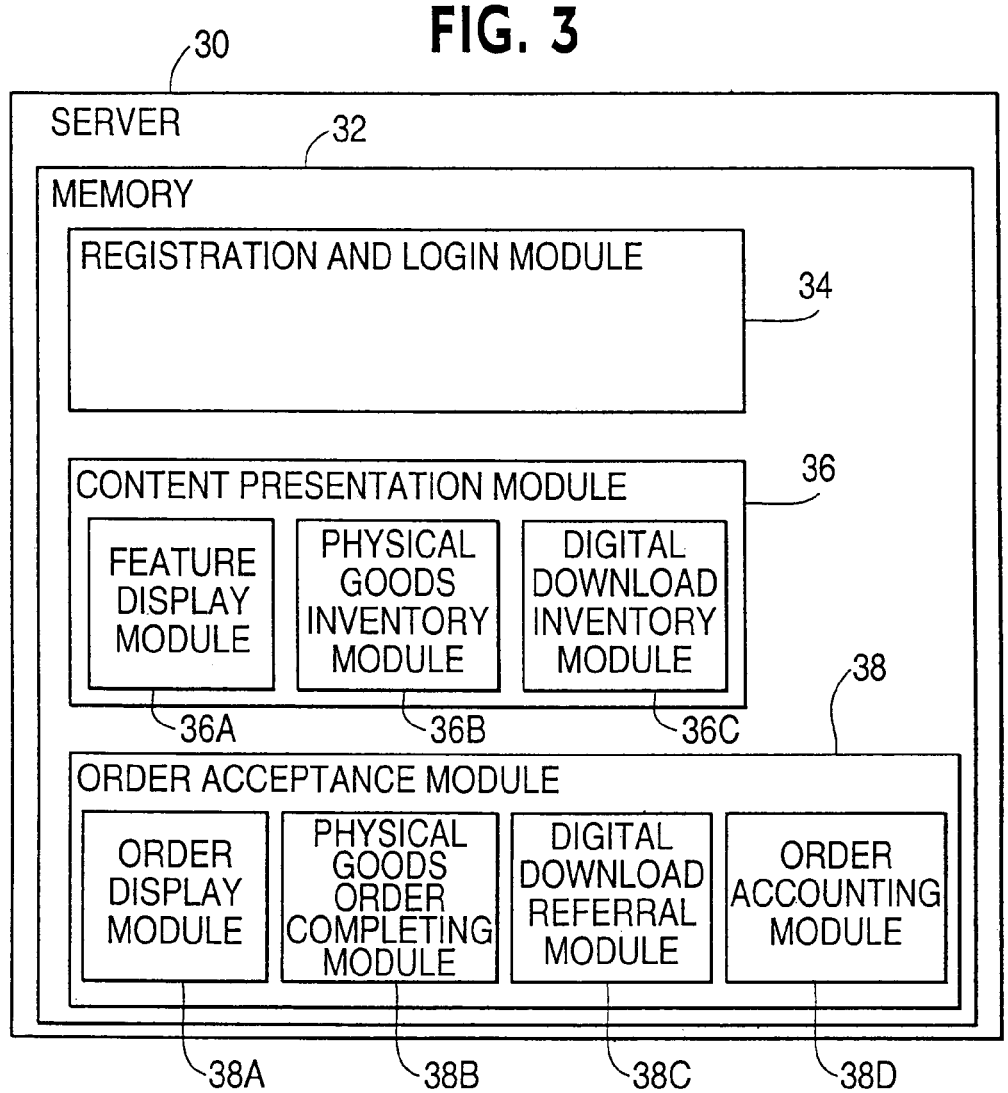
FIG. 3 is a block diagram illustrating an apparatus utilized by a provider of purchasable content in accordance with the present invention.

Reference is now made to FIG. 3 which illustrates a block diagram of the structure and/or functionality of the first presence 30 in accordance with one or more aspects of the present invention. The first presence 30 preferably includes a computing device, such as a network server, including one or more processors (e.g., CPUs) for executing one or more software programs that imbue the first presence 30 with desirable functionality. Preferably, the first presence 30 includes a memory 32 in which a registration and login module 34, a content presentation module 36, and an order acceptance module 38 are stored. It is understood that these modules may take the form of software only, hardware only, or a combination of software and hardware.

As will be discussed in more detail below, the registration and login module 34 may implement software suitable for receiving and/or managing consumer account information. For example, the module 34 may interface with an integral and/or separate database (or databases) of information concerning respective consumers, the information being utilized to register and/or login to the first presence 30 over the electronic network 10.

The content presentation module 36 preferably includes a feature display module 36A, a physical goods inventory module 36B, and a digital download inventory module 36C. As will be discussed in more detail below, these modules permit the first presence 30 to transmit certain information concerning the purchasable content over the electronic network 10. Preferably, the information is specifically geared towards marketing the purchasable content to the one or more consumers 20 by way of transmission of pages over the electronic network 10.

The order acceptance module 38 preferably includes an order display module 38A, a physical goods order completing module 38B, a digital download referral module 38C, and an order accounting module 38D. In general, the order acceptance module 38 provides the first presence 30 with the ability to organize and manipulate information concerning the processing of an order from a consumer 20 for purchasable content, such as displaying the specific items of purchasable content desired by the consumer 20, calculating the costs for the purchasable content, etc. Further details regarding the specific functionality of the order acceptance module 38 will be described in more detail hereinbelow.

Figure 4:
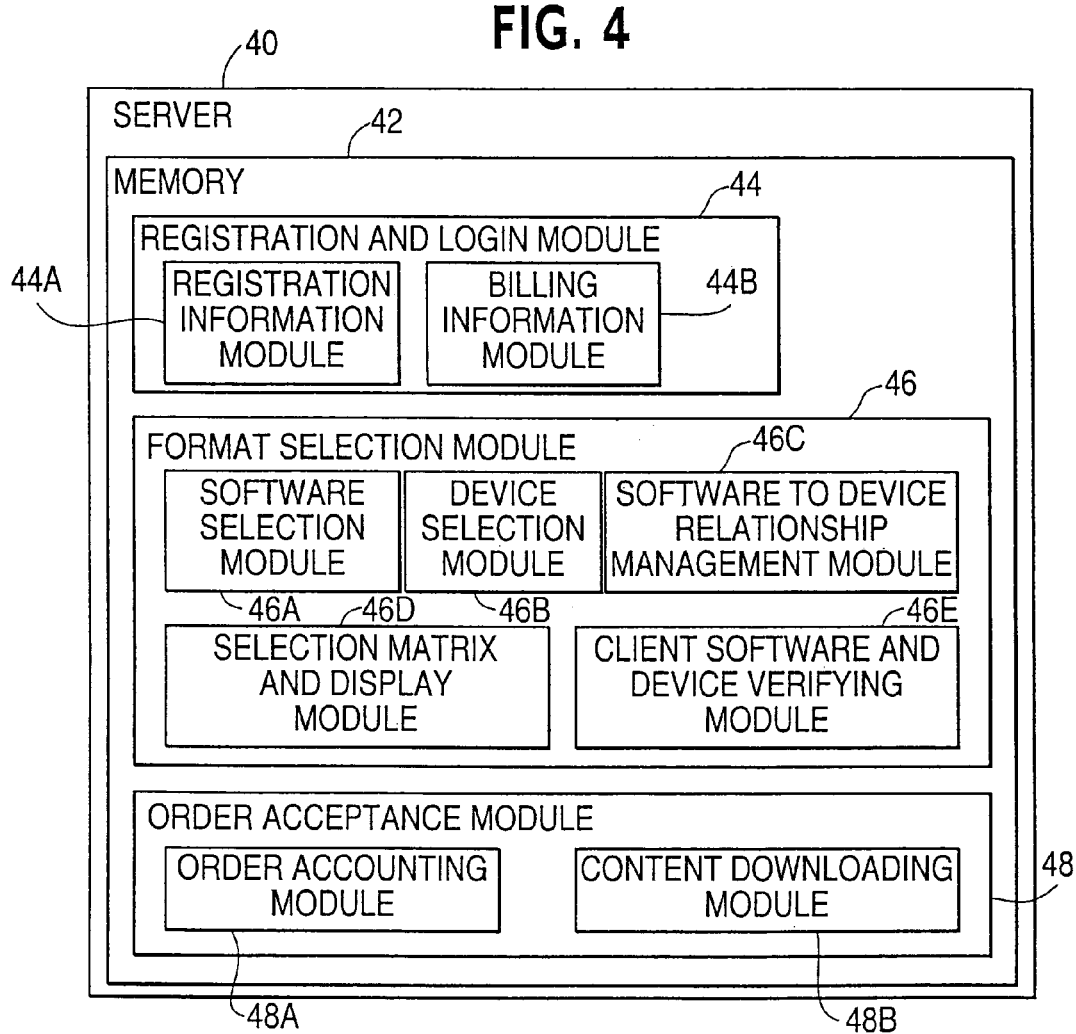
FIG. 4 is a block diagram illustrating an apparatus utilized by another provider of purchasable content in accordance with the present invention.

Reference is now made to FIG. 4 which illustrates a block diagram of the apparatus and/or functionality of the second presence 40. Preferably, the second presence 40 includes a computing device, such as a network server, having one or more processors (e.g., a CPU) capable of executing one or more software programs that imbue the second presence 40 with desirable functionality. Preferably, the second presence 40 includes a memory 42 containing a registration and login module 44, a format selection module 46, and an order acceptance module 48. It is understood that these modules may be implemented in software, hardware, and/or a combination of hardware and software.

Preferably, the registration and login module 44 includes a registration information module 44A and a billing information module 44B. In general, the registration and login module 44 permits the second presence 40 to interface with the one or more consumers 20 over the electronic network 10, such as by collecting registration information, managing existing accounts, etc. Further details on the registration and login module 44 will be presented hereinbelow.

Preferably, the format selection module 46 includes a software selection module 46A, a device selection module 46B, a software-to-device relationship management module 46C, a selection matrix and display module 46D, and a client software and device verifying module 46E. In general, the format selection module 46 preferably imbues the second presence 40 with the capability of transmitting format options for the purchasable content to the one or more consumers 20 over the electronic network 10, the format options including, for example, types of software on which the purchasable content may be executed, types of portable devices on which the purchasable content may be stored, types of compression formats in which the purchasable content may be configured, types of CODECs through which the purchasable content may be processed, and types of digital rights management (DRM) algorithms to which the purchasable content may be subject. Additional details concerning the format selection module 46 will be presented hereinbelow.

The order acceptance module 48 preferably includes an order accounting module 48A and a content downloading module 48B. In general, the order acceptance module 48 preferably imbues the second presence 40 with the capability of interfacing with the one or more consumers 20 over the electronic network 10 in order to download purchasable content of the downloadable digital data variety. Further details of the order acceptance module 48 and its functionality will be presented hereinbelow.

Figure 5:
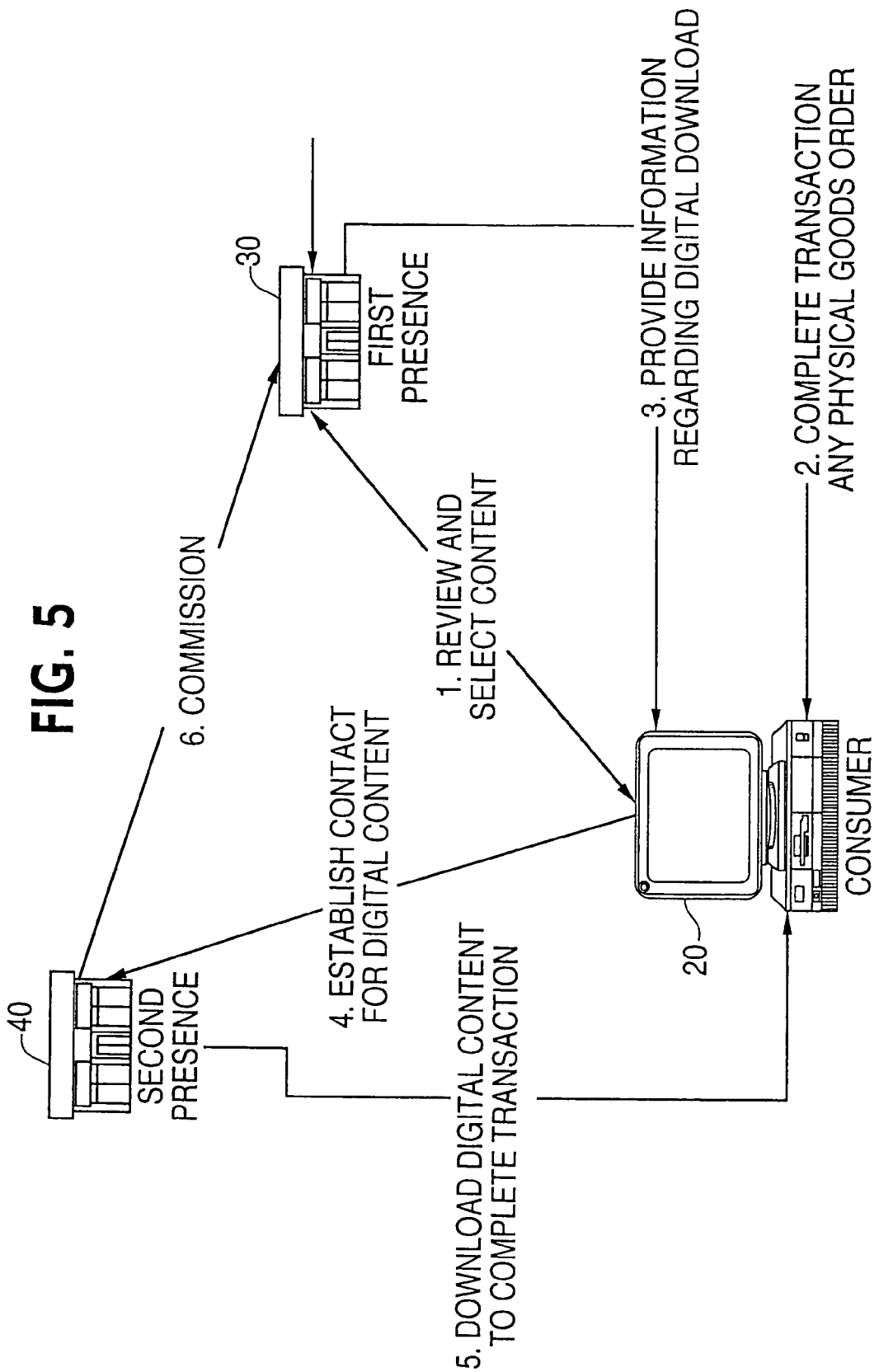
FIG. 5 is a flow diagram illustrating operations carried out by one or more entities of FIG. 1 in accordance with the present invention.

Reference is now made to FIG. 5, which illustrates a flow diagram of some actions between the consumer 20, the first presence 30, and/or the second presence 40 over the electronic network 10 in accordance with one or more aspects of the present invention. It is understood that the actions presented in FIG. 5 do not represent an exhaustive list and that the time order in which they are labeled and/or discussed is not restrictive, but rather is presented by way of example only. As indicated at action (1), the consumer 20 may browse for, review, and/or select purchasable content by way of interaction with the first presence 30 over the electronic network 10. With reference to FIGS. 2 and 3, the consumer 20 may execute its browser program 26 in order to connect to the first presence 30 over the electronic network 10. The first presence 30 may transmit one or more pages over the electronic network 10 to the consumer 20, where the one or more pages include information concerning the purchasable content. The content presentation module 36 (FIG. 3) of the first presence 30 may be utilized to produce, manipulate, manage and/or transmit the one or more pages containing the information concerning the purchasable content. If employed, the initial connection by the consumer 20 to the first presence 30 may involve the transmission of a registration and/or login page from the first presence 30 to the consumer 20 over the electronic network 10 (preferably managed by way of registration and login module 34, see FIG. 3). As is known in the art, this registration and/or login page may require that the consumer 20 enter a user name and/or password to obtain further pages from the first presence 30. If the consumer 20 were a first time visitor to the first presence 30, then registration may also be required as is known in the art.

Figure 6A:
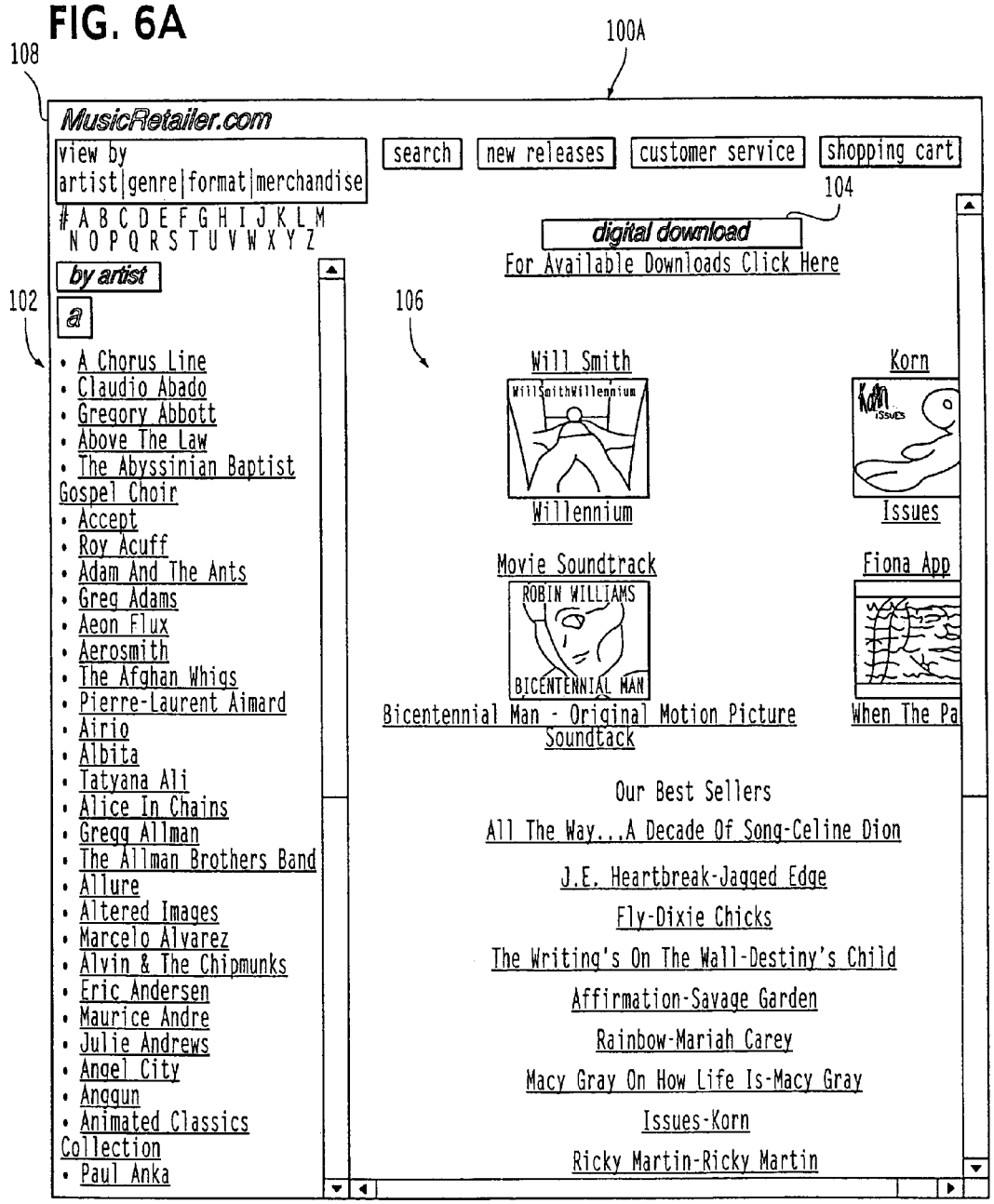

FIG. 6 is an illustrative example of a page 100A suitable for providing information concerning the purchasable content to the consumer 20 over the electronic network 10.

Page 100A is preferably displayed on the consumer's computing device 20 in a first window. The term "window" used herein is a separate viewing area on a display screen (e.g., a screen associated with the consumer's computing device 20), where multiple viewing areas are permitted as part of a graphical user interface. A window can be moved, minimized, maximized and/or varied in size depending on the desire of a user. Preferably, the first window includes a banner portion 108 that may be utilized by the first presence 30 to brand the window, MusicRetailer.com being the brand illustrated. Preferably, page 100A includes information concerning both downloadable digital data, such as music, and physical storage media containing digital or analog data. The downloadable digital data is preferably music available for downloading over the electronic network 10 to the consumers' computing device 20 for storage. The physical storage media, on the other hand, would be shipped to the consumer 20 using known shipping channels.

Page 100A is preferably organized into frames, a left frame 102 preferably listing purchasable content according to artists and genre. The list is preferably presented by way of text indicia. Page 100A preferably includes a main frame area 106 containing additional details concerning the purchasable content. Information concerning downloadable digital data may preferably be obtained by activating an executable icon 104 disposed in an upper portion of the main frame 106. Those skilled in the art will appreciate that activating an executable icon in this context may involve activating a hypertext link that may cause a link with another presence on the electronic network 10 or that may cause one or more additional pages to be transmitted from the first presence 30 to the consumer 20 over the electronic network 10. The main frame 106 of page 100A also preferably includes information concerning physical storage media.

Main frame 106 also preferably contains a listing of "featured" selections that the first presence 30 may want to market to consumers 20. For example, album titles such as Will Smith, Korn, The Bicentennial Man soundtrack, etc. may be listed in main frame 106. The featured selections are preferably displayed by way of text and/or graphic indicia. Preferably, the indicia associated with the artists, genre, and music titles represent executable icons permitting the consumer 20 to drill down and obtain additional information concerning the purchasable content. For example, when the consumer 20 executes an icon pertaining to the artist Lauryn Hill (e.g. in frame 102), additional information concerning purchasable content by that artist is preferably provided to the consumer 20 over the electronic network 10. The information is preferably provided by way of one or more pages transmitted from the first presence 30 the consumer 20. By way of example, page 100B of FIG. 6B includes a variety of information concerning purchasable content by the performer Lauryn Hill. As shown, the music title "Everything Is Everything" is identified via text and graphics (still frame and/or motion) indicia at location 110. At location 112, a listing of various forms that the purchasable content may take is provided, namely, CD single or digital download. A hyperlink to obtain information concerning other titles by Lauryn Hill is disposed at location 114.

The consumer 20 may issue a command over the electronic network 10 indicating that he or she wishes a transaction for the purchasable content. This command is preferably initiated by activating an executable icon associated with the purchasable content. In the example illustrated in FIG. 6B, the command may take the form of activating the phrase "Digital Download" (at location 112) associated with the music title "Everything Is Everything." Alternatively, the consumer 20 may activate the phrase "Everything Is Everything" at locations 110, 116 or he or she may activate an icon associated with the price of the purchasable content, e.g., location 118. When the consumer 20 activates an icon indicating that he or she wishes a transaction for the purchasable content (i.e., a command is transmitted over the electronic network 10), the first presence 30 preferably determines whether the command indicates that the consumer 20 wishes a transaction for downloadable digital data or physical storage media and stores that information (e.g., in a virtual "shopping cart"). An indication that the consumer 20 has provided a command indicating that he or she wishes a transaction for an item of purchasable content is provided by way of page 100B, for example, by reciting "Your cart has 1 item" at location 120.

The consumer 20 may browse the first presence 30 and identify other items of purchasable content of interest. For example, when the consumer 20 activates an icon for the artist Pearl Jam, more information regarding that artist is preferably transmitted from the first presence 30 to the consumer 20 over the electronic network 10. This information may take the form of page 100C illustrated in FIG. 6C, which includes text and graphics indicia at location 120. As shown, the album title "Yield" is featured in the main frame 106 and may be purchased in various forms, such as by way of physical storage media (e.g., vinyl discs, CDs, cassettes, mini discs) listed at location 122. Downloadable digital data for this album title might not be available and, therefore, no corresponding indicia or icon would be provided on page 100C.

A list of music titles of the "Yield" album is preferably provided at location 124, namely, Brian Of J., Faithful, No Way, Given To Fly, etc. At location 126, a brief narrative of certain items of interest concerning the album is preferably provided. The narrative may contain information concerning the artist, the production company, the engineers, the recording location, the number of music titles contained on the album, and a listing of at least some of the music titles.

An audio sample of one or more of the music titles contained on the album may preferably be accessed by activating one or more icons at location 128. Preferably, the one or more icons are organized as a pull-down menu of music titles, where one or more of the titles may be activated by the consumer 20. In response to the activation of a music title icon at location 128, the first presence 30 preferably transmits audio data over the electronic network 10 to the consumer 20 such that the consumer 20 may sample the purchasable content. Activating the "other titles by this artist" icon at location 123 preferably causes additional information to be provided on page 100C from the first presence 30.

When the consumer 20 issues a command indicating that he or she wishes a transaction for a further item purchasable content, for example, the album Yield, the first presence 30 preferably again determines whether the command indicates that the consumer 20 wishes to purchase physical storage media or downloadable digital data and stores the information (e.g., in the virtual shopping cart). The first presence 30 preferably provides additional information on page 100C indicating that the consumer 20 issued a command for additional purchasable content, such as providing indicia at location 120 stating "Your cart has 2 items."

The interaction between the consumer 20 and the first presence 30 over the electronic network 10 (e.g., vis-a-vis pages 100A, 100B, 100C) is preferably managed by way of the content presentation module 36 (FIG. 3) of the first presence 30. Preferably, information concerning any featured purchasable content, e.g. that listed in main frame 106 of page 100A (FIG. 6A), is preferably managed by way of the feature display module 36A (FIG. 3). The presentation of information concerning the available physical storage media (e.g., that displayed on pages 100B–C) is preferably managed by way of the physical goods inventory module 36B (FIG. 3) of the first presence 30. The presentation of information concerning the available downloadable digital data, e.g., that listed on page 100B, is preferably managed by way of the digital download inventory module 36C (FIG. 3) of the first presence 30. The content presentation module 36 of the first presence 30 preferably achieves these functions using known software techniques executed on one or more database servers coupled to one or more databases.

When the consumer 20 is finished browsing the first presence 30 for purchasable content, wishes to complete the transaction for purchasable content, or otherwise wishes to review the items of purchasable content in the shopping cart, a summary of information is preferably transmitted from the first presence 30 to the consumer 20 over the electronic network 10. The summary is preferably presented on one or more pages 100D (FIG. 6D) and is preferably visually divided into information concerning physical storage media at location 130 and downloadable digital data at location 132. In the particular example presented herein, the album that the consumer 20 indicated that he or she wished to purchase is preferably listed at location 130 in terms of at least one of product identification number, item (or album) title, price, quantity, and subtotal cost. The summary information for downloadable digital data at location 132 is preferably substantially similar to the information concerning the physical storage media. The consumer 20 is preferably permitted to edit the summary information by adding or deleting items as desired. The order is preferably updated by executing the "update order" icon and the order may be cleared in its entirety by executing the "clear all" icon. The order may be submitted by executing the "submit order" icon. The summary information displayed on page 100D is preferably managed by way of the order display module 38A contained within the order acceptance module 38 (FIG. 3) of the first presence 30.

In response to the submit order command by the consumer 20, the first presence 30 preferably transmits remittance information concerning the purchasable content that the consumer 20 indicated he or she wished to purchase. Preferably, the remittance information is provided by way of page 100E transmitted from the first presence 30 to the consumer 20 over the electronic network 10. Information concerning the items of purchasable content of the physical storage media type are preferably segregated (e.g., at location 140) from the information concerning the purchasable content of the downloadable digital data type (e.g., at location 144). Preferably, the information as to each type of purchasable content includes at least one of respective costs (e.g., totals), and respective subtotals of aggregate costs to purchase the physical storage media and downloadable digital data. Shipping costs may also be provided concerning the costs of shipping the physical storage media to the consumer 20 using any of the known carriers. Preferably, applicable sales tax is calculated for the purchase of the physical storage media separate from the downloadable digital data. Preferably, the respective subtotals for the physical storage media and the downloadable digital data are calculated as the aggregate of the costs of the respective items of purchasable content, the tax (if any), and the shipping costs.

Preferably, page 100E includes one or more input fields at, for example, locations 144, 146 that are operable to receive remittance information from the consumer 20. It is most preferable that the remittance information is associated only with the physical storage media identified for purchase by the consumer 20. At location 144 remittance information concerning the consumer's credit card is preferably received, such as, the consumer's name, the consumer's credit card number, the type of credit card, and the expiration date. It is understood that other types of remittance information may be requested and/or input at location 144, such as demand deposit account numbers, debit card numbers, etc. At location 146, billing address information is preferably requested and/or received, for example, the name of the consumer 20, a phone number for the consumer 20, a billing and/or delivery address, etc.

Preferably, the functionality discussed above with respect to page 100E is managed by the order accounting module 38D (FIG. 3) of the first presence 30.

Referring again to FIG. 6E, the consumer 20 preferably activates the "submit order" icon (disposed at the lower portion of page 100E) when he or she wishes to complete the transaction for the physical storage media content. It is most preferred that the activation of the submit order icon also initiates additional actions leading to the completion of the transaction concerning the downloadable digital data content. In accordance with one or more aspects of the present inventions, the first presence 30 is capable of completing the transaction as to the physical storage media but is not capable of transmitting the downloadable digital data over the electronic network 10. Rather, it is the second presence 40 that is capable of transmitting the downloadable digital data through the electronic network 10 for reception by the one or more consumers 20. For example, the first presence 30, although being a purchasable content marketer, may not have custody, control, or access to a database (or databases) containing the downloadable digital data. Nevertheless, the first presence 30 may market the downloadable digital data and the physical storage media to the one or more consumers 20 by way of the pages transmitted over the electronic network 10. The second presence 40, therefore, might have custody, control, and/or access to a suitable database (or series of databases) containing the downloadable digital data, although the second presence 40 might not engage in the marketing of the downloadable digital data to the one or more consumers 20 in the same manner as the first presence 30.

With reference to FIG. 5 action (2), when the first presence 30 determines that the consumer 20 has issued a command indicating that he or she wishes to purchase physical storage media or both physical storage media and downloadable digital data, the completion of the transaction as to the physical storage media is preferably completed by way of the first presence 30, but the transaction as to the downloadable digital data is preferably not completed by way of the first presence 30. Rather, as shown at action (3) in FIG. 5, the first presence 30 merely provides information concerning the downloadable digital data (e.g., including at least some of the information provided by way of pages 100A–E of FIGS. 6A–E). It is understood, therefore, that the one or more pages transmitted by the first presence 30 are capable of providing information to, and receiving information from, the consumer 20 sufficient to complete the transaction for the physical storage media content. The completion of the physical storage media transaction is preferably managed by way of the physical goods order completing module 38B (FIG. 3) of the first presence 30.

Those skilled in the art will appreciate that the information concerning the downloadable digital data provided by the first presence 30 to the consumer 20 (action (3) of FIG. 5) may not include an offer to purchase. Instead, only general information concerning downloadable digital data might be provided by the first presence 30, where the consumer 20 obtains further information and opportunities to order the downloadable digital data from the second presence 40.

As shown at action (4) in FIG. 5, the activation of the submit order icon (FIG. 6E) initiates contact between the consumer 20 and the second presence 40 over the electronic network 10. Preferably, the activation of the submit order icon automatically links the consumer 20 to the second presence 40 such that the consumer 20 may interact with the second presence 40 to complete the transaction as to the downloadable digital data. The action of automatically linking the consumer 20 to the second presence 40 over the electronic network 10 is preferably executed only when the consumer 20 has provided a command that indicates that he or she wishes a transaction for downloadable digital data content. Preferably, the action of automatically linking the consumer 20 to the second presence 40 over the electronic network 10 is managed by the digital download referral module 38C of the first presence 30 (FIG. 3).

The automatic link between the consumer 20 and the second presence 40 over the electronic network 10 preferably results in the second presence 40 transmitting at least one page of information over the electronic network 10 to the consumer 20. In accordance with one or more aspects of the inventions, the one or more pages from the second presence 40 are preferably presented to, and manipulated by, the consumer 20 by way of at least one second window on the consumer's computing device 20. The second window is preferably separate from the first window (through which the consumer 20 interacts with the first presence 30). As a general matter, the second window is preferably automatically activated (e.g., opened so that the consumer 20 can interact with the one or more pages from the second presence 40) in response to (or proximate to) the automatic link to the second presence 40. For example, the second window may be activated when the one or more pages from the second presence 40 are received by the consumer 20 over the electronic network 10. The first window is preferably not active when the second window is activated.

With reference to FIG. 7, the transition of the consumer's interaction from the first presence 30 to the second presence 40 over the electronic network 10 is described in greater detail. FIG. 7 is a flow diagram illustrating actions that take place prior to, during, and after the transition. At actions 300 and 302, the consumer 20 interacts with the first presence 30 over the electronic network 10 (e.g., as described above with reference to pages 100A–E) via the first window on the display screen of the consumer's computing device 20. At action 304, the first presence 30 determines whether the consumer 20 indicates a desire for a transaction for downloadable digital data. If the first presence 30 determines that the consumer 20 indicates a desire for a transaction for downloadable digital data, then the process flow branches to action 306 where the consumer 20 is automatically linked to the second presence 40 over the electronic network 10. More particularly, the second window automatically opens for facilitating interaction between the consumer 20 and the second presence 40. The interaction between the consumer 20 and the second presence 40 preferably includes completing the transaction for the downloadable digital data (action 308), which will be discussed in greater detail hereinbelow with respect to FIGS. 8A–G.

At action 310, the second window preferably closes after the transaction for the downloadable digital data is complete. Preferably, the first window is again activated when the transaction for the downloadable digital data is completed, and the consumer 20 is automatically linked back to the first presence 30 on the electronic network 10. Alternatively, the consumer 20 may be automatically linked to a third presence on the electronic network 10 after the transaction for the downloadable digital data has been completed. The automatic link between the consumer 20 and the third presence (if implemented) is preferably manifest by way of the first window.

With reference to action (4) of FIG. 5, details concerning the interaction between the consumer 20 and the second presence 40 over the electronic network 10 in response to receiving a command from the consumer 20 indicating that it wishes a transaction for downloadable digital data content will now be discussed. By way of example, the one or more pages of information transmitted by the second presence 40 to the consumer 20 (e.g., in the second window) preferably include page 200A shown in FIG. 8A. Preferably, the second window is branded by an entity associated with the second presence 40. In this example, the second window is branded by Sony Music™, which provides the consumers 20 with an indication of the source of the downloadable digital data. Advantageously, the first and second windows may be branded by different entities and, thus, the consumer 20 will recognize that different sources may provide the purchasable content.

Preferably, page 200A includes an area 204 associated with registering the consumer 20 as a new customer. Area 204 preferably includes a plurality of input fields in which the consumer 20 may enter his or her name, e-mail address, zip code, password verification, etc., it being understood that this list is provided by way of example only. When the consumer 20 is not a new customer, but is a returning customer, page 200A preferably permits the execution of a login procedure at area 206 that enables the consumer 20 to receive further pages from the second presence 40. More particularly, area 206 includes one or more input fields including, for example, user identification information (which may be the consumer's e-mail address) and password information. It is preferred that the functionality of areas 204 and 206 of page 200A are managed by way of registration information module 44A (FIG. 4) of second presence 40.

Figure 6B:
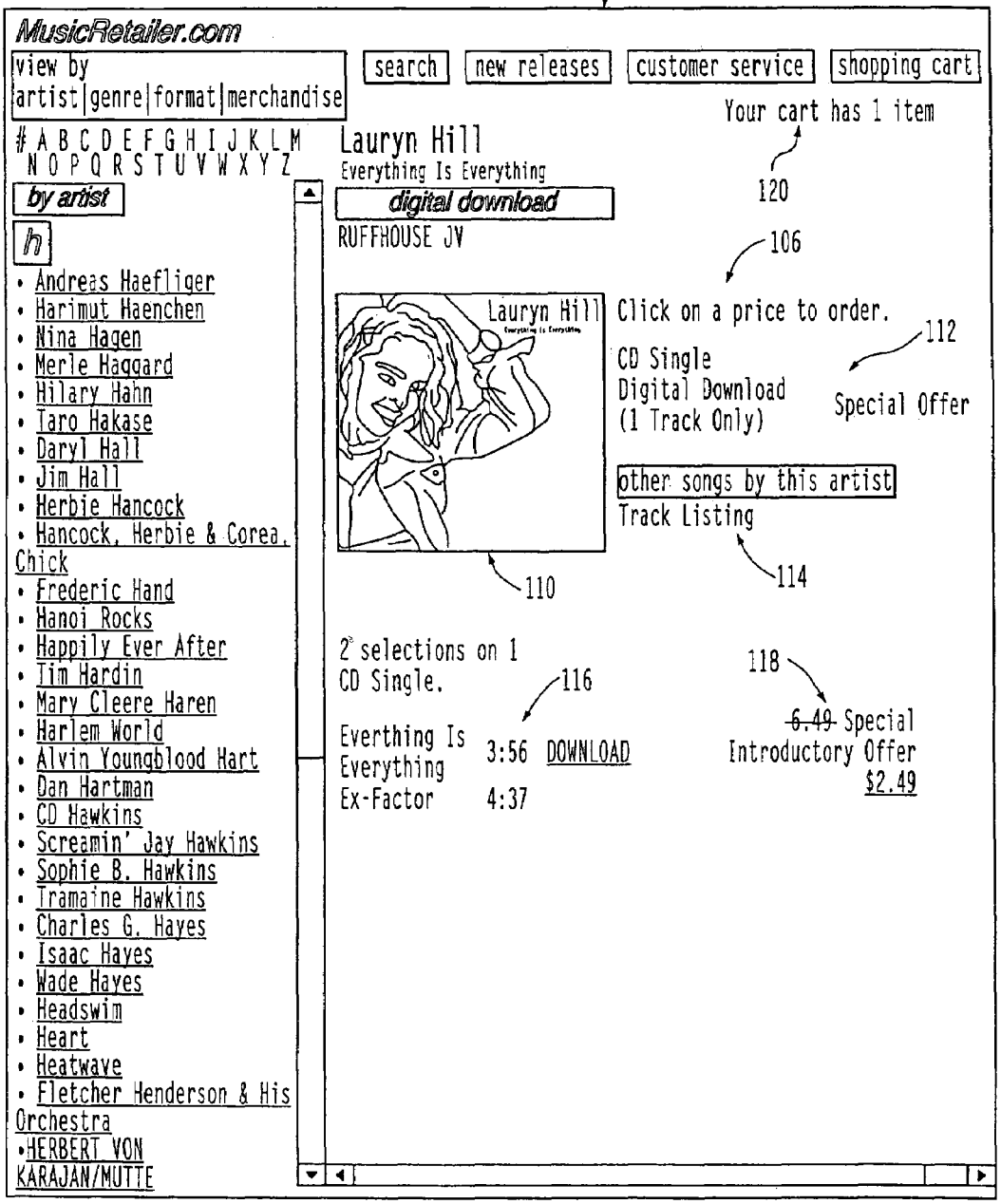
Figure 6C:
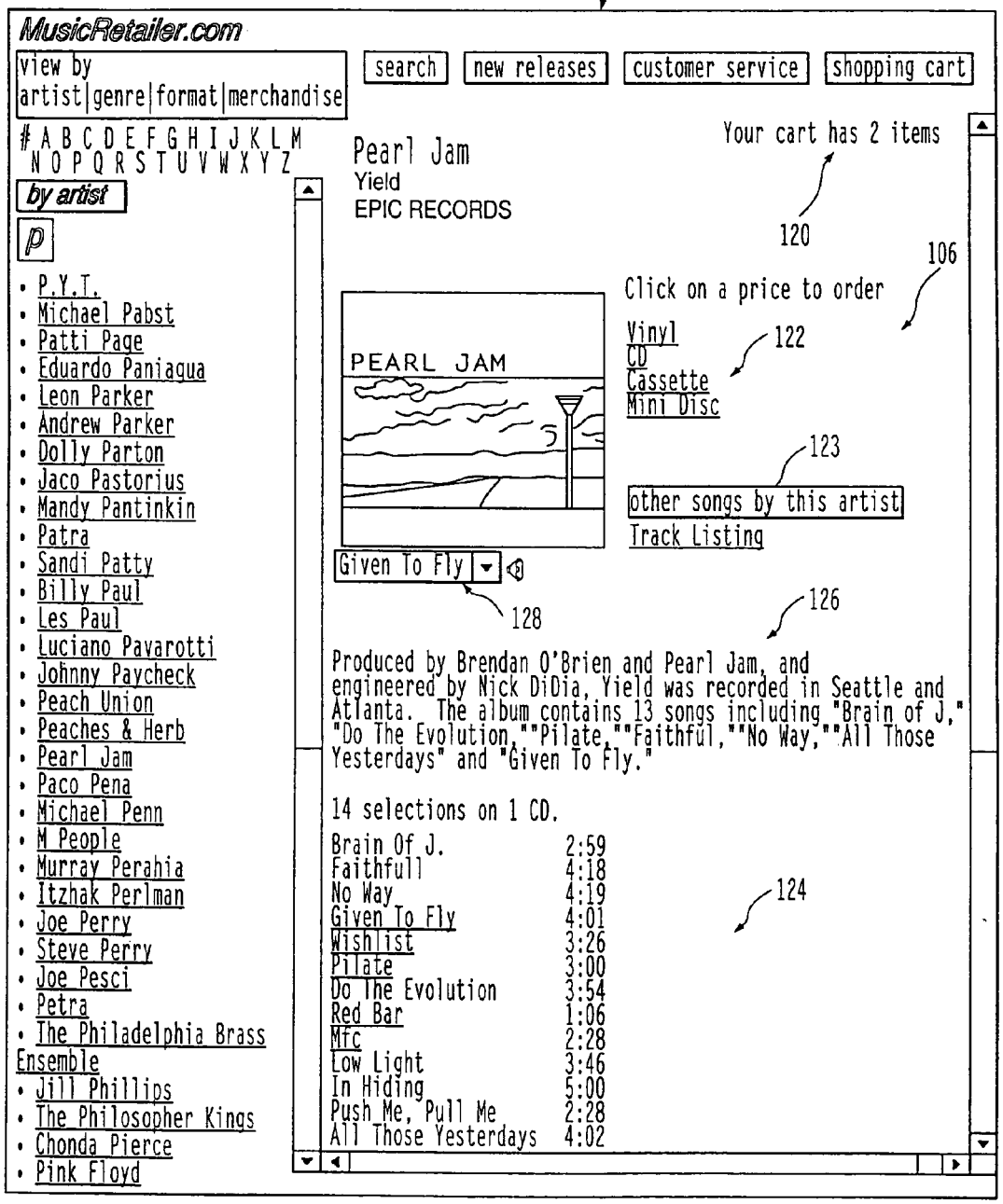
Figure 8F:
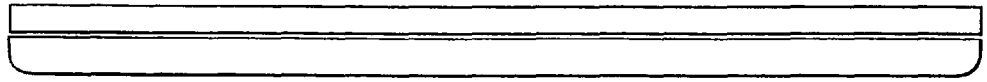

After the consumer 20 has successfully logged into the second presence 40, the second presence 40 preferably transmits another page 200B to the consumer 20 over the electronic network 10. Page 200B preferably provides a summary of billing information concerning the downloadable digital data content identified by the consumer 20 for download when he or she was interacting with the first presence 30 (described hereinabove with respect to FIGS. 6A–6E). In the example hereinabove, the consumer 20 identified the single music title "Everything Is Everything" by the artist Lauryn Hill for download (FIG. 6B). Thus, the music title "Everything Is Everything" is identified at area 208 on page 200B as being an item of purchasable content ready for download. Preferably, the artist's name, respective costs for each item of downloadable digital data content, subtotals for the items, sales tax, and grand total costs for downloading all items of downloadable digital data content are also included at area 208. The consumer 20 is also preferably presented with an opportunity to receive more information on a particular artist at location 210, for example, by way of an executable icon, input field, check-off box, etc.

Preferably, at area 212 of page 200B, separate billing information for completing the transaction for downloadable digital data is obtained from the consumer 20 by way of one or more input fields, executable icons, or the like. For example, information concerning a type of credit card to be used by the consumer 20 for remittance, the credit card name, the credit card number, the expiration date, the consumer address, etc. is preferably entered by the consumer 20 at area 212. In sum, pages 200A–B include at least one of: (i) registration inputs for registering the consumer 20; (ii) login inputs for permitting the consumer 20 access to further portions of the at least one page from the second presence 40; (iii) summary information including at least one of a list of the content selected by the consumer 20, and remittance information for the content selected by the consumer 20; and (iv) billing inputs for receiving information from the consumer 20 concerning a remittance method. For security purposes, the summary information and the billing inputs are included on page 200B, which may be accessed only after the consumer 20 has logged in. It is preferred that the functionality and/or information of page 200B is managed by way of billing information module 44B (FIG. 4) of the second presence 40.

When the billing information at area 212 has been entered, the consumer 20 preferably advances the download process by executing the "Next" icon at location 214 on page 200B. This preferably prompts the second presence 40 to transmit another page 200C to the consumer 20 over the electronic network 10. Page 200C preferably includes an interactive area 216 that facilitates the selection of various format options concerning the downloading of the downloadable digital data content. The format options preferably include types of software on which the downloadable digital data content may be executed. By way of example, these types of software are identified on page 200C as "Computer Desktop Software", it being understood that the consumer's computing device 20 might not be a desktop, but might be another appropriate computing device. The types of software are preferably listed at location 218 and include, for example, Windows Media Player, Liquid Audio, and Real Jukebox, it being understood that any other of the known types of software, or software developed in the future, may be listed on page 200C without departing from the scope of the inventions. The types of software on which the downloadable digital data may be executed preferably correspond with respective players for converting at least one of the audio data, the video data, and the text data of the downloadable digital data content into one or more forms perceivable by the consumer 20. In use, the software programs are preferably part of, or are otherwise in communication with, the content playing module 28B (FIG. 2) of the consumer's computing device 20.

The format options also preferably include types of portable devices on which the downloadable digital data content may be stored, secure portable device being most preferred. By way of example, a list of secure portable devices is provided at location 220 on page 200C, the list including, but not being limited to, Sony Memory Stick Walkman & VAIO Music Clip, Diamond Rio, Creative Nomad II, SANYO, Panasonic, etc. In use, the portable devices are preferably associated with, or are otherwise in communication with, the portable device management module 28C (FIG. 2) of the consumer's computing device 20. Preferably, the portable devices on which the downloadable digital data may be stored are compliant with Secured Digital Music Initiative (SDMI) specifications. SDMI is a forum of many companies and organizations representing information technology, consumer electronics, security technology, the world wide recording industry, and Internet service providers. SDMI's charter is to develop open technology specifications that protect the playing, storing, and distribution of digital music. Digital Music Access Technology™ (DMAT) is a trademark for products that are compliant with SDMI specifications.

The format options also preferably include types of compression formats in which the downloadable digital data content may be configured and/or the types of CODECs through which the downloadable digital data may be processed. Preferably, these types of compression formats and/or types of CODECs are listed on page 200C in correspondence with one or more of the types of software (or players) on which the downloadable digital data may be executed. For example, the types of compression formats and/or types of CODECs usable with the Windows Media Player software are preferably listed in association with one another. The association may preferably take the form of listing the types of compression formats and/or CODECs in proximity to the respective types of software (or players). For example, the Atrac 3 compression format (and/or other compression formats) usable on the Windows Media Player software are listed at location 222 of page 200C near the Windows Media Player indicia. Likewise the compression formats and/or CODECs usable with the Liquid Audio software (or player) are preferably listed at location 218 proximate to the Liquid Audio indicia. When more than one compression format and/or CODEC may be usable with a given type of software (or player), they are preferably listed by way of a drop-down box that may be activated by the consumer 20. In use, the software programs are preferably part of, or are otherwise in communication with, the content playing module 28B (FIG. 2) of the consumer's computing device 20.

The format options also preferably include types of digital rights management (DRM) algorithms to which the downloadable digital data content may be subject. DRM algorithms are known in the art to facilitate the transmission of downloadable digital data over an electronic network while preserving copyright protection, if any, of the content. The types of digital rights management algorithms are preferably listed in association with the software programs (or players) with which they are compatible. For example, the Windows DRM associated with the Windows Media Player is located at location 224. When more than one digital rights management algorithm is usable with a corresponding software program (or player), they are preferably listed by way of a drop-down box that may be activated by the consumer 20. In use, the digital rights management algorithm is preferably part of, or otherwise in communication with, the DRM module 28A (FIG. 2) of the consumer's computing device 20.

Preferably, each type of software, each type of compression format, each type of digital rights management algorithm and/or each type of portable device is displayed on page 200C and selectable by way of activation by the consumer 20. For example, the format options listed at area 216 by way of indicia are preferably highlightable or are otherwise selectable by way of check-off boxes 230. For example, the consumer 20 may opt to select the Windows Media Player software program (player) on which the downloadable digital data may be executed by clicking on check-off box 230 adjacent to the indicia for that software program. This preferably highlights that indicia (or "greys out" the other software programs), for example, as shown in FIG. 8D. To that end, the Windows Media Player indicia is shown in bold or darker contrast, while the Liquid Audio and Real Jukebox indicia are in lighter contract.

Page 200C preferably includes an active matrix feature which permits the consumer 20 to select only from among compatible types of portable devices when a particular software program, in this case the Windows Media Player program, is selected. By way of example, only the Sony Music Stick Walkman & VAIO Music Clip and the Diamond Rio portable devices are selectable once the Windows Media Player software program has been selected by the consumer 20. This is preferably made known to the consumer 20 by highlighting these portable devices and/or graying out the other portable devices, etc. To that end, Sony Memory stick indicia and the Diamond Rio indicia is shown in darker contrast as compared to the Creative Nomad III indicia, the Sanyo indicia, or the Panasonic indicia.

More generally, a given type of software might be compatible with only respective subsets of the types of compression formats, the types of digital rights management algorithms, and/or the types of portable devices. The active matrix feature permits selection by the consumer 20 from among only the compatible subsets of types of portable devices, types of digital rights management algorithms and/or types of compression formats. Advantageously, this avoids the potential frustration of having the consumer 20 select invalid format options and greatly simplifies the process for downloading the downloadable digital data content.

Preferably, the active matrix feature is multi-directional (or multi-dimensional). For example, a given type of portable device may be compatible with only respective subsets of types of software, types of compression formats, and/or types of digital rights management algorithms. Accordingly, when the consumer 20 selects a given type of portable device, the consumer 20 may be permitted to select from among only the compatible respective subsets of types of software, types of compression formats, and/or types of digital rights management algorithms. Likewise, a given type of compression format may be compatible with only respective subsets of the types of software, the types of digital rights management algorithms and/or the types of portable devices. Thus, when a given type of compression format is selected by the consumer 20, the consumer 20 may be permitted to select from only among the compatible respective subsets of the types of software, the types of digital rights management algorithms, and/or the types of portable devices. Still further, a given type of digital rights management algorithm may be compatible with only respective subsets of the types of software, the types of compression formats, and/or the types of portable devices. Thus, when the consumer 20 selects a given type of digital rights management algorithm, the consumer 20 is preferably only permitted to select from among the compatible respective subsets of the types of software, the types of compression formats, and the types of portable devices.

With reference to FIG. 4, the functionality of page 200C is preferably managed by way of the format selection module 46 of the second presence 40. The software program listing and selection functions are preferably managed by way of software selection module 46A of the second presence 40. The listing and selection functions are preferably managed by way of device selection module 46B of the second presence 40. The active matrix feature is preferably managed by way of selection matrix and display module 46D of the first presence 40. The selection matrix and display module 46D preferably interfaces with the software-to-device relationship management module 46C in order to produce and display the compatible selections available after a particular selection has been made by the consumer 20. The software-to-device relationship management module 46C identifies the relationships among the information displayed to the consumer 20, such as which types of software programs (players), CODECs, compression algorithms, DRM algorithms, and portable devices that are compatible and available for combination.

Referring again to FIG. 8D, when the consumer 20 has selected one or more of the format options, and the selection is received by the second presence 40 (e.g., by way of the consumer 20 activating the "Next" icon 232), the process for downloading the downloadable digital data content preferably advances. A next step in this process may include a check as to whether the consumer's computing device 20 contains an appropriate version of the selected software program, e.g., the Windows Media Player software program, and/or whether the consumer's computing device 20 includes an appropriate version of the selected compression format, or portable device, etc. If one or more required or desirable software resources are not resident on the consumer's computing device 20, the second presence 40 preferably transmits another page 200D (FIG. 8E) to the consumer 20 over the electronic network 10 which includes a hyperlink to one or more locations on the electronic network 10 from which the consumer 20 may download the resource(s). When the consumer 20 has downloaded the resource(s), the process for downloading the downloadable digital data preferably advances (for example, by way of the consumer 20 activating the "Continue" icon 234). A next step in the process may include providing verification that the consumer's computing device 20 includes all necessary or desirable software resources as, for example, by way of page 200E shown in FIG. 8F. The software resource check and verification functions are preferably managed by way of client software and device verifying module 46E (FIG. 4) of the second presence 40.

When the consumer 20 is ready to complete the download process, he or she preferably activates the "Complete Purchase" icon 236 of page 200E (FIG. 8F) which preferably prompts the second presence 40 to transmit another page 200F (FIG. 8G) to the consumer 20 over the electronic network 10. Page 200F preferably includes a list of the selected titles (in this example the music title "Everything Is Everything"), the artists, the time, the file size, and/or an estimate of time to complete the download (preferably as a function of modem speed). The consumer 20 preferably initiates the download by executing the "Download Song" icon 238, which preferably prompts the second presence 40 to transmit the downloadable digital data to the consumer 20 over the electronic network 10 in a format consistent with at least one of the selected type of software, the selected type of compression format, the selected type of digital rights management algorithm, and the selected type of portable device.

With reference to FIGS. 8C–D, the consumer 20 may preferably select two or more types of software programs, two or more types of compression formats, two or more types of digital rights management algorithms, and/or two or more types of portable devices. In response, the second presence 40 preferably transmits the downloadable digital data content to the consumer 20 over the electronic network 10 in formats consistent with the selected types of software programs, the selected types of compression formats, the selected types of digital rights management algorithms, and/or the selected types of portable devices.

The downloading action (5) of FIG. 5 further illustrates the interaction between the second presence 40 and the consumer 20 during the downloading phase. The downloading process is preferably managed by way of content downloading module 48B (FIG. 4) of the second presence 40.

Preferably, the format selection module 46 (FIG. 4) of the second presence 40 stores the selected format options (e.g., at least one of the selected type(s) of software, the selected type(s) of compression format(s), the selected type(s) of digital rights management algorithm(s), and the selected type(s) of portable device(s)) and designates the stored format options as default format options. The second presence 40 preferably transmits the default format options to the consumer 20 over the electronic network 10 at a later time in response to another command from the consumer 20 indicating that he or she wishes to purchase downloadable digital data. Advantageously, the consumer 20 may easily accept the default format options by simply activating the "Next" icon 232 (FIG. 8D), thereby quickly advancing the process for downloading the downloadable digital data content. Alternatively, the consumer 20 may edit the default format options as desired.

Preferably, order accounting module 48A (FIG. 4) of the second presence 40 manages the final accounting and settlement of the transaction for downloadable digital data content. This preferably includes the settlement of the consumer's account, for example, by way of his or her credit card, DMA account, etc. It is most preferred that the accounting and settlement function includes the calculation of (and/or designation of) a commission from an entity associated with the second presence 40 to an entity associated with the first presence 30 such that the first presence 30 may receive a commission for the marketing and/or retail of the downloadable digital data content. The commission feature is further illustrated by way of action (6) of FIG. 5.

One skilled in the art will appreciate from the above disclosure that the present invention covers a method of carrying out one or more actions by the first presence 30 vis-à-vis its interaction with one or both of the consumer 20 and the second presence 40 for facilitating the purchase of content by the consumer 20 over the electronic network 10 (such as the actions discussed with respect to FIGS. 5, 6A–E, and 7). The skilled artisan will appreciate from the disclosure herein that the present invention also covers a system for facilitating the purchase of content by the consumer 20 over the electronic network 10. By way of example, a block diagram of one such system was presented and discussed with reference to FIGS. 1 and 3 hereinabove. In accordance with one or more aspects of the invention, such a system may generally include at least one processor capable of executing one or more software programs, where the software programs cause the system to perform one or more of the actions discussed hereinabove with respect to FIGS. 5, 6A–E, and 7.

One skilled in the art will appreciate from the disclosure hereinabove that the present invention covers a method of carrying out one or more actions by the second presence 40 vis-à-vis its interaction with one or both of the consumer 20 and the first presence 30 for facilitating the purchase of content by the consumer 20 over the electronic network 10 (such as the actions discussed with respect to FIGS. 5, 7, and 8A–G). The skilled artisan will appreciate from the disclosure herein that the present invention also covers a system for facilitating the purchase of content by the consumer 20 over the electronic network 10. By way of example, a block diagram of one such system was presented and discussed with reference to FIGS. 1 and 3 hereinabove. In accordance with one or more aspects of the invention, such a system may generally include at least one processor capable of executing one or more software programs, where the software programs cause the system to perform one or more of the actions discussed hereinabove with respect to FIGS. 5, 7 and 8A–G.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method for facilitating a transaction for purchasable musical content over an electronic network, the method comprising:

maintaining a first network server that hosts a first web page on the electronic network to which a consumer may connect;

transmitting the first web page from the first network server to the consumer over the electronic network, the first web page including a listing of purchasable musical content, the purchasable musical content including two types, the first type comprising downloadable digital musical data and the second type comprising physical musical media, wherein the first network server is enabled to allow the consumer to complete a purchase transaction for the physical musical media, but is not enabled to allow the consumer to complete a purchase transaction for the downloadable digital musical data;

allowing the consumer to browse the listing of purchasable musical content at the first web page on the electronic network;

receiving a command at the first network server from the consumer over the electronic network indicating that the consumer has selected certain of the purchasable musical content to purchase;

determining by the first network server based on the received command if the selected purchasable musical content is either the first type being downloadable digital musical data or the second type being physical musical media;

executing a computer program stored in the first network server, the computer program comprising instructions for receiving the determination, and if the selected purchasable musical content is determined by the first network server to be the first type of purchasable musical content, the computer program automatically linking the consumer to a second network server which maintains custody of the selected downloadable digital musical data and hosts a second web page on the electronic network, the second web server:

transmitting the second web page to the consumer over the electronic network;

allowing the consumer to complete a purchase transaction at the second web page for the selected purchasable content, wherein the consumer enters transaction information at the second web page, and after the purchase transaction is complete, the second server transferring custody of the downloadable digital musical data from the second network server through the electronic network to the consumer;

executing a computer program stored in the first network server, the computer program comprising instructions for receiving the determination, and if the selected purchasable musical content is determined by the first network server to be the second type of purchasable music content, the first web server:

allowing the consumer to complete a purchase transaction at the first web page for the selected purchasable content, wherein the consumer enters transaction information at the first web page, the transaction information including at least the consumer's mailing address, and after the purchase transaction is complete, the first server causing the physical musical media to be physically mailed to the mailing address entered by the consumer.

2. The method of claim 1, further comprising displaying the first web page in a first window and the second page in a second window.

3. The method of claim 2, wherein the first and second windows are displayed simultaneously on a monitor display.

4. The method of claim 2, wherein the first window is branded by a first entity and the second window is branded by a second entity.

5. The method of claim 2, wherein the second window is activated when the second web page is received by the consumer over the electronic network and the first window is not active when the second window is activated.

6. The method of claim 1, wherein the physical musical media include at least one of optically readable media, magnetically readable media, and mechanically readable media.

7. The method of claim 1, wherein the second web page includes at least one of: (i) registration inputs for registering the consumer; (ii) login inputs for permitting the consumer access to further portions of the second page; (iii) summary information including at least one of a list of the purchasable content selected by the consumer, and remittance information for the purchasable content selected by the consumer; and (iv) billing inputs for receiving information from the consumer concerning a remittance method.

8. The method of claim 7, wherein the summary information and the billing inputs are included on the further portions of the second web page.

* * * * *

UNITED STATES PATENT AND TRADEMARK OFFICE
CERTIFICATE OF CORRECTION

| | | |
|---|---|---|
| PATENT NO. | : 7,043,447 B2 | Page 1 of 1 |
| APPLICATION NO. | : 09/836094 | |
| DATED | : May 9, 2006 | |
| INVENTOR(S) | : Hughes et al. | |

It is certified that error appears in the above-identified patent and that said Letters Patent is hereby corrected as shown below:

Col. 17, line 55, delete "downioadable" and insert -- downloadable -- therefor.

Signed and Sealed this

Twenty-ninth Day of August, 2006

JON W. DUDAS
*Director of the United States Patent and Trademark Office*